United States Patent [19]
Miyagaki

[11] Patent Number: 5,450,475
[45] Date of Patent: Sep. 12, 1995

[54] METHOD FOR CONTROLLING ELECTRONIC TELEPHONE SWITCHES

[75] Inventor: Tsutomu Miyagaki, Fukuoka, Japan

[73] Assignee: Fujitsu Limited, Kanagawa, Japan

[21] Appl. No.: 210,235

[22] Filed: Mar. 17, 1994

[30] Foreign Application Priority Data

Sep. 6, 1993 [JP] Japan .................... 5-221200

[51] Int. Cl.⁶ ............................................ H04M 3/50
[52] U.S. Cl. ...................................... 379/67; 379/88; 379/89; 379/201; 379/207
[58] Field of Search .................... 379/67, 88, 89, 207, 379/201

[56] References Cited

U.S. PATENT DOCUMENTS

| | | | |
|---|---|---|---|
| 4,580,012 | 4/1986 | Matthews et al. | 379/89 |
| 4,790,003 | 12/1988 | Kepley et al. | 379/88 |
| 4,899,373 | 2/1990 | Lee et al. | 379/207 |
| 4,926,462 | 5/1990 | Ladd et al. | 379/89 |
| 4,932,042 | 6/1990 | Baral et al. | 379/67 |
| 4,935,954 | 6/1990 | Thompson et al. | 37/89 |
| 4,939,771 | 7/1990 | Brown et al. | 379/67 |
| 4,941,167 | 7/1990 | Cannalte et al. | 379/67 |
| 4,996,704 | 2/1991 | Brunson | 379/67 |
| 5,003,575 | 3/1991 | Chamberlin et al. | 379/89 |
| 5,029,200 | 7/1991 | Haas et al. | 379/207 |
| 5,187,735 | 2/1993 | Herrero Garcia | 379/67 |
| 5,199,062 | 3/1993 | Von Meister et al. | 379/67 |

FOREIGN PATENT DOCUMENTS

| | | |
|---|---|---|
| 58-47365 | 3/1983 | Japan . |
| 273757 | 3/1990 | Japan . |
| 3183252 | 8/1991 | Japan . |

Primary Examiner—James L. Dwyer
Assistant Examiner—Parag Dharia

[57] ABSTRACT

A method for controlling electronic telephone switches includes linking a plurality of telephone switches to each other over a digital network and coupling one of the telephone switches to a voice mail system (VMS) having a mailbox. An identifier of the VMS is stored in the telephone switches. A first user's telephone call is routed from a telephone switch coupled to the first user to a telephone switch coupled to a second user when the first user requests to be connected with the second user. An identifier of the second user is routed from the telephone switch coupled to the second user to the VMS based upon the VMS identifier and, the first user's call is connected to the VMS if the second user is a holder of the mailbox. Information from the first user is forwarded to the VMS and stored in the mailbox. Data representing that the VMS has the information in the mailbox from VMS is transmitted to the second user based upon the second user's identifier. The stored information is routed to the second user at the second user's request and the information stored in the mailbox is erased.

6 Claims, 12 Drawing Sheets

METHOD FOR CONTROLLING ELECTRONIC TELEPHONE SWITCHES

BACKGROUND OF THE INVENTION

1. Field of the Invention

The present invention relates to a method for controlling electronic telephone switches, and more particularly to a method for controlling electronic telephone switches providing a voice mail system (VMS).

2. Description of the Related Art

Conventionally known is a telephone system including an electronic telephone switch (referred to as electronic switch or switch hereinafter) which provides a VMS to render a voice mail service (for example, refer to Japanese Laid-Open Patent No. SHO. 58-47365).

However, when a plurality of electronic switches networked together render a voice mail service, the system has a problem that an expensive VMS must be installed in each of the plurality of such electronic switches.

SUMMARY OF THE INVENTION

The present invention provides a method for controlling electronic telephone switches comprising: (1) linking a plurality of telephone switches to each other over a digital network; (2) coupling one of the telephone switches to a voice mail system (VMS) having a mailbox; (3) storing an identifier of the VMS in the telephone switches; (4) routing a first user's telephone call from a telephone switch coupled to the first user to a telephone switch coupled to a second user, when the first user requests to be connected with the second user; (5) routing an identifier of the second user from the telephone switch coupled to the second user to the VMS based upon the VMS identifier and connecting the first user's call to the VMS, if the second user is a holder of the mailbox; (6) forwarding information from the first user to the VMS and storing the information in the mailbox; (7) transmitting data from VMS to the second user based upon the second user's identifier, the data representing that the VMS has the information in the mailbox; (8) routing the stored information to the second user at the second user's request; and (9) erasing the information stored in the mailbox.

Step (3) may comprise the steps of: previously receiving from the second user dialing signals including the VMS identifier; and storing data corresponding to the VMS identifier in a memory area of the telephone switch coupled to the second user, the memory area being addressed by the second user's identifier; and step (5) comprises the steps of: reading the VMS identifier from the memory area; determining a route to the VMS based upon the VMS identifier; and routing the second user's identifier and the first user's call to the VMS through the determined route.

Step (7) may comprise the steps of determining a route to the second user based upon the second user's identifier; and routing the data to the second user through the determined route.

Step (8) may further comprise the steps of receiving a telephone call from the second user; and routing the call to the VMS based upon the VMS identifier to connect the second user to the VMS.

Step (5) may further comprise the steps of; previously receiving from the second user dialing signals for designating digital data stored in a memory of the telephone switch coupled to the second user; routing the designated digital data to the VMS; and permitting the VMS to convert the digital data to audible data to be heard by the first user.

The digital data may represent a reason why a telephone call is forwarded from the second user to the VMS.

Step (9) may comprise the steps of; receiving from the second user dialing signal including a code for erasing the stored information; routing the code to the VMS basing upon the VMS identifier; and permitting the VMS to erase the information stored in the mailbox.

Step (9) may further comprise the steps of determining a route to the second user based upon the second user's identifier; and routing a response from the VMS to the second user through the determined route when the stored information has been erased.

The plurality of telephone switches is defined as two, three, four or the more telephone switches. A single VMS is coupled to a presentative of them. That is, the plurality of telephone switches use the single VMS in common to perform a voice mail service for their users.

Preferably, the telephone switch is an electronic apparatus which receives and routes incoming telephone calls, for example, a private branch exchanger (PBX), a local switch, or a tandem switch.

BRIEF DESCRIPTION OF THE DRAWINGS

By way of example and to make the description clear, reference is made to the accompanying drawings in which.

DETAILED DESCRIPTION OF THE PREFERRED EMBODIMENTS

The present invention will be detailed by way of the following preferred embodiments.

At the outset, the principle of the present invention will be explained with respect to FIGS. 1A and 1B.

Figure 1A:
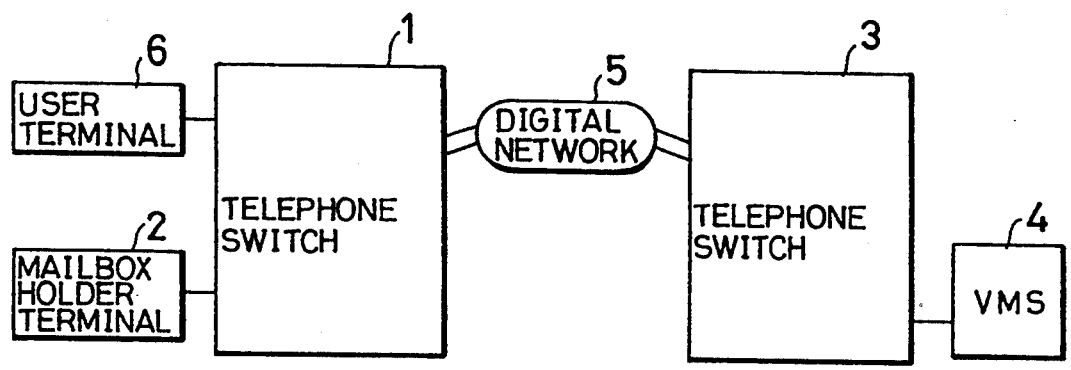
FIGS. 1A and 1B are block diagrams illustrating basic constructions of the present invention.

Referring to FIG. 1A, a telephone switch 1 and a telephone switch 3 are linked together over a digital network 5, a VMS 4 is coupled to the switch 3, and an incoming call from a user terminal (telephone) 6 coupled to the switch 1 to a mailbox holder terminal (telephone) 2 coupled to the switch 1 is connected to the VMS 4 by forwarding the incoming call to the VMS 4. The VMS 4 has mailboxes (not shown) and the mailbox holder terminal 2 is a terminal (telephone) of a user holding the mailbox. When the incoming call is connected to the VMS 4, digital information stating a forwarding reason why the incoming call is forwarded from the mailbox holder terminal 2 to the VMS 4 is conveyed to the switch 3 via the digital network 5. Then the VMS 4 converts the digital information into audible information corresponding thereto. The audible information is given to the user terminal 6 as information indicating the forwarding reason. At the same time, a message to be delivered from the user terminal 6 to the mailbox holder terminal 2 is accumulated in the VMS 4.

Subsequently, when the accumulation of the messages is completed, the VMS 4 transmits predetermined information to the switch 3. The predetermined information is utilized to specify which of the switches is coupled to the mailbox holder terminal 2. The predetermined information is transmitted to the specified switch (the switch 1) via the digital network 5 thereby notifying the mailbox holder terminal 2 of the fact that the accumulation of the message in the VMS 4 has been completed.

Furthermore, when the mailbox holder terminal 2 is notified of the completion of the message accumulation, the mailbox holder terminal 2 is connected to the VMS 4 via the digital network 5.

Then a command from the mailbox holder terminal 2 erases the message accumulated in the VMS 4. Upon completion of the erasure thereof, the VMS 4 transmits specific information to the switch 3. The specific information is utilized to specify the first switchboard 1 coupled to the mailbox holder terminal 2. The specific information is transmitted to the specified switch 1 via the digital network 5 thereby notifying the mailbox holder terminal 2 of the fact that the erasure of messages in the VMS 4 has been completed.

Figure 1B:
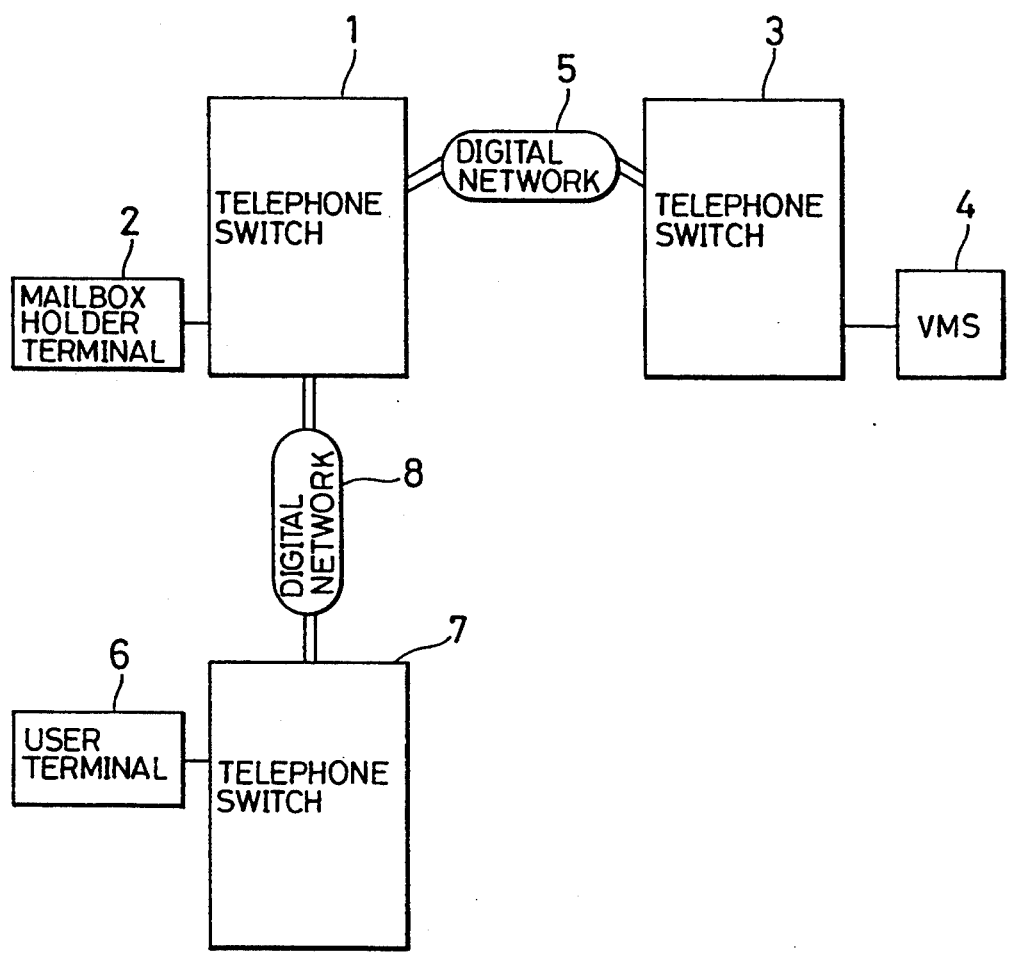

Referring to FIG. 1B, a switch 7, a switch 1 and a switch 3 are linked over digital networks 5, 8. A VMS 4, a user terminal 6 and a mailbox holder terminal 2 are coupled to the switch 3, the switch 7 and the switch 1, respectively. A call from the user's terminal 6 to a mailbox holder terminal 2 is connected to the VMS 4 by forwarding the call, and then digital information expressing a forwarding reason why the call forwarded from the terminal 2 to the VMS 4 is transmitted over a digital network 5 to the switch 3 when the call is connected to the VMS 4. The VMS 4 converts the digital information into audible information corresponding thereto. The audible information is given to user terminal 6 as information expressing why the terminal 2 is absent, and a message from the user terminal 6 is accumulated in the VMS 4.

Subsequently when the accumulation of the message from the user terminal 6 to the VMS 4 is completed, the VMS 4 transmits predetermined information to the switch 3. Based on the predetermined information, the switch 3 determines which of the switches is coupled to the mailbox holder terminal 2. The predetermined information is transmitted to the determined switch 1 over a digital network 5 thereby notifying the terminal 2 of the completion of the message accumulation in the VMS 4.

Furthermore, when the terminal 2 is notified of the completion of the message accumulation, the terminal 2 is connected to VMS 4 over the digital network 5.

Then a command is given from the terminal 2 to erase the message stored in the VMS 4. At the completion of the erasing operation, specific information is transmitted from the VMS 4 to the switch 3. Based on the specific information, the switch 3 determines which of the switches is coupled to the mailbox holder terminal 2. The specify information is transmitted to the determined switch 1 via a digital network 5 thereby notifying the terminal 2 of the completion of message erasure in the VMS 4.

The switches 1, 3, 7 and the VMS 4 may comprise conventional, off-the-shelf equipment that has been custom programmed for use in this system.

Figure 2A:
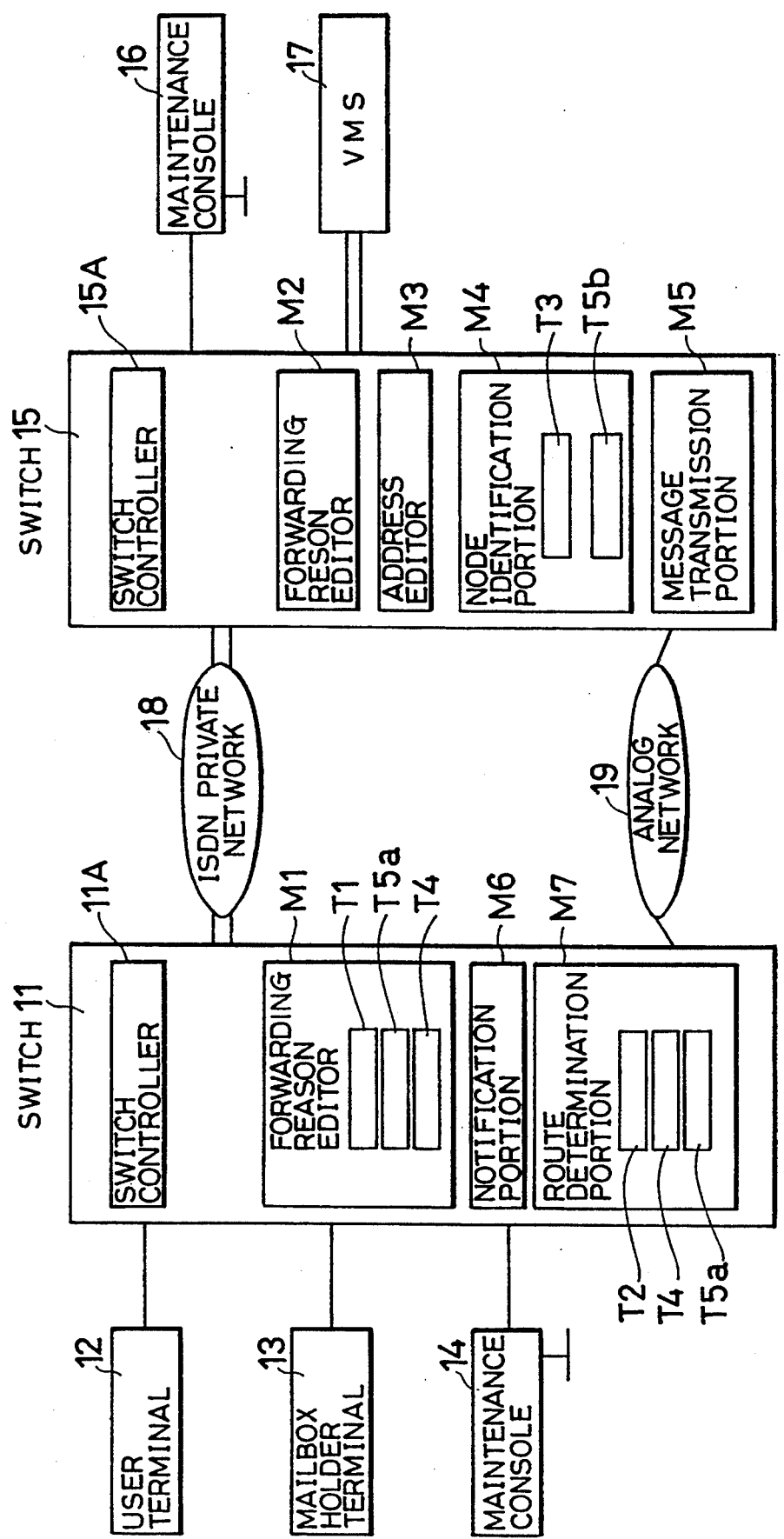
FIGS. 2A and 2B are block diagrams illustrating embodiments of the preset invention.
Figure 2B:
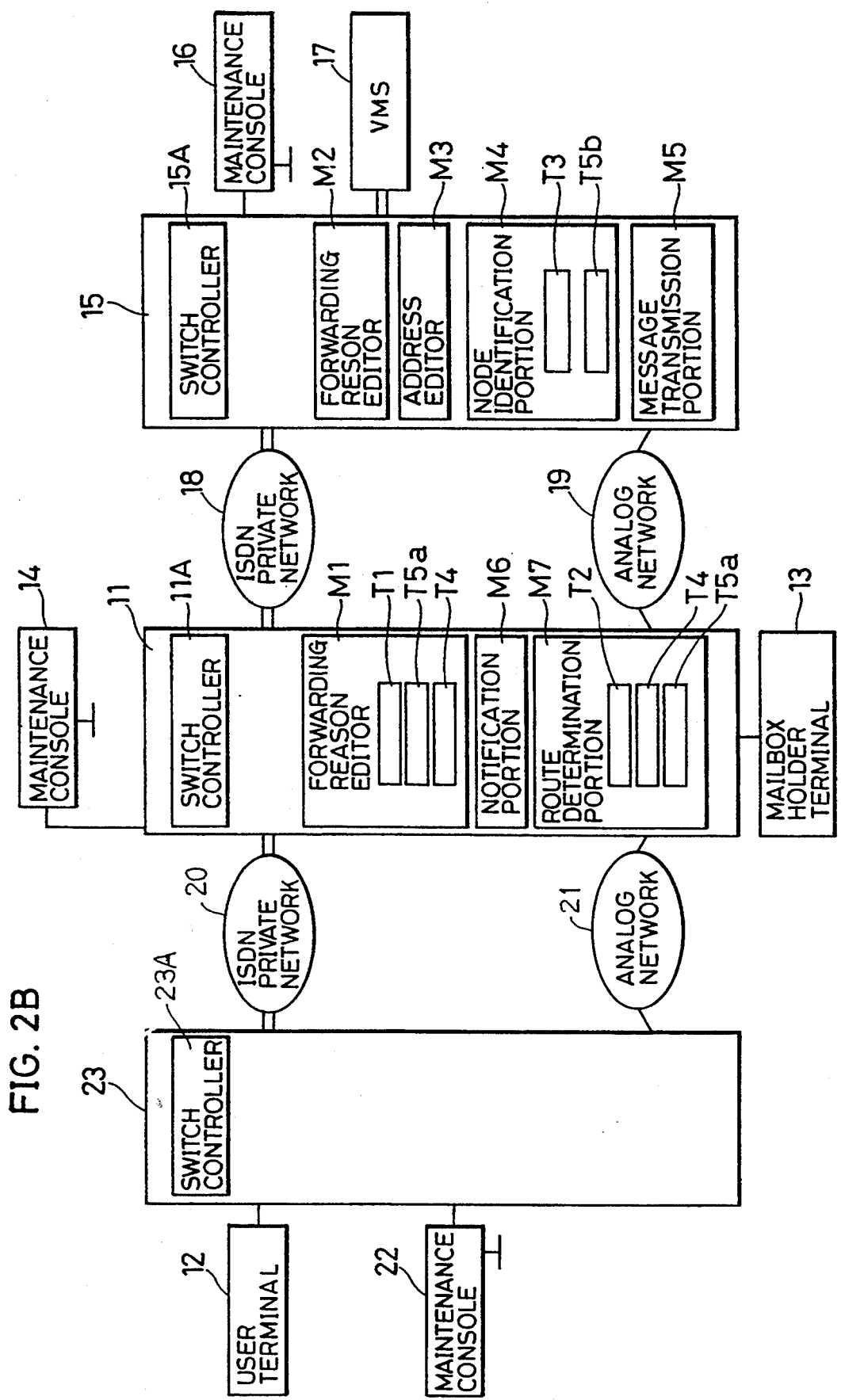

FIG. 2A shows a block diagram of a first embodiment based upon the principle shown in FIG. 1A. FIG. 2B shows a block diagram of a second embodiment based upon the principle shown in FIG. 1B.

Referring to FIG. 2A, to one electronic switch 11 are connected a user terminal (telephone) 12, a mailbox holder terminal (telephone) 13 and a maintenance console 14. To the other electronic switch 15 are connected a maintenance console 16 and a VMS 17. (Note the fact that no VMS is connected to the electronic switch 11). Other user terminals and mailbox holder terminals connected to the electronic switches 11 and 5 are not shown for simplicity. Then the electronic switch 11 and the electronic switch 15 are linked together over an ISDN private network 18 and an analog network 19. The electronic switch 11 is given a node number 700 and a truck group number 100 and the electronic switch 15 is given a node number 701 and a trunk group number 101. These numbers are stored in the respective memory tables of these switches, as will be described below.

Referring to FIG. 2B, to an electronic switch 23 are coupled a user terminal 12 and a maintenance console 22. To an electronic switch 11 are coupled a mailbox holder terminal 13 and a maintenance console 14. To an electronic switch 15 are coupled a maintenance console 16 and a VMS 17 (No VMS is coupled to the electronic switches 23 and 11, and other user terminals connected to the electronic switches 23, 11 and 15 are not shown in the drawings for simplicity.). Then the electronic switch 23 and the electronic switch 11 are linked together over an ISDN private network 20 and an analog network 21. The electronic switch 11 is given the node number 700 and the trunk group number 100 whereas the electronic switch 15 is given the node number 701 and the trunk number 101, similarly to the embodiment of FIG. 2A. The electronic switch 23 is given a node number 702 and a trunk group number 102. These numbers are stored in the respective memory tables of the respective switches, as will be explained below.

The electronic switch 23 comprises a normal exchange controller 23A for receiving and routing telephone calls. Referring to FIGS. 2A and 2B, the electronic switch 11 comprises a forwarding reason editor M1, a notification portion M6 and a transfer route determination portion M7 in addition to a normal switchboard controller 11A. The electronic switch 15 comprises a forwarding reason editor M2, an address editor M3, a node identification portion M4 and a message transmission portion M5 in addition to a conventional switch controller 15A.

Then the forward reason editor M1 provides a RAM storing tables T1, T4 and T5a. The transfer route determination portion M7 provides a RAM storing tables T2, T4 and T5a. In addition, the node identification portion M4 provides a RAM storing tables T3 and T5b.

The table T1 stores a forwarding reason why an incoming call is forwarded from the mailbox holder terminal 13 to the VMS 17 (either "the absence of a receiver", "no response", or "occupied line"), the node number 701 of the switchboard 15 and the dial number of the VMS 17. The table T1 is indexed with the logical extension number of the mailbox holder terminal 13.

The table T2 stores the node number 701 of the electronic switch 15 and the dial number of the VMS 17.

The table T3 stores the trunk group number 100 in an area indexed with the node number 700 of the electronic switch 11.

The table T4 stores the trunk group number 101 in an area indexed with the node number 701 of the electronic switch 15.

The table T5a stores the node number 700 of the switch 11 where the table T5a resides.

The table T5b stores the node number 701 of the switch 15 where the table T5b resides.

The forwarding reason editor M1, upon receiving from the user terminal 12 "the node number of the electronic switch 11 plus the dial number of the terminal 13", reads from the table T1 the forwarding reason why the incoming call is forwarded from the mailbox holder terminal 13 to the VMS 17 thereby editing the forwarding reason as an ISDN message.

The forwarding reason editor M2, upon receiving the ISDN message including the forwarding reason, edits the forwarding reason as information to be transmitted to the VMS 17.

The address editor M3 edits the node number of the electronic switch 11 and the dial number of the terminal 13 as mailbox address information recognizable by the VMS 17.

The node identification portion M4 identifies the node number of the electronic switch 11 by checking with the table T3 identification data of the mailbox holder terminal 13 notified from the VMS 17 when the accumulation of a message is completed at the VMS 17.

The message transmission portion M5, upon receiving data representing the arrival of the user's message from the VMS 17, edits the data into an ISDN message thereby transmitting it to a route read from the table T3.

The notification portion M6 notifies the mailbox holder terminal 13 of the arrival of the message based on the dial number included in the ISDN message.

The route determination portion M7 automatically determines a route to the switch 15 by using the tables T2, T4 and T5a for transmitting the edited ISDN message to the electronic switch 15, when the forwarding reason editor M1 edits the ISDN message.

The route determination portion M7 automatically determines a route to electronic switch 15 by using tables T2, T4 and T5a for notifying the electronic switch 15 of the identification, when the mailbox holder terminal 13 identifies the arrival of the message to the VMS 17.

General operations of the embodiments will be explained with respect to FIGS. 2A, 2B and 3 through 17.

Figure 3:
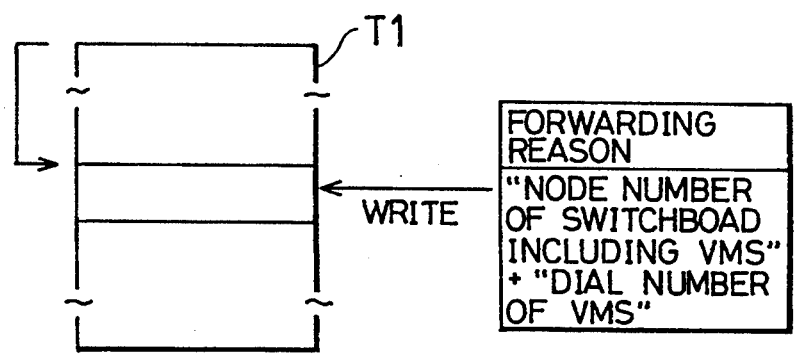
FIGS. 3 through 17 are views illustrating part of the behavior of the embodiments.
Figure 4:
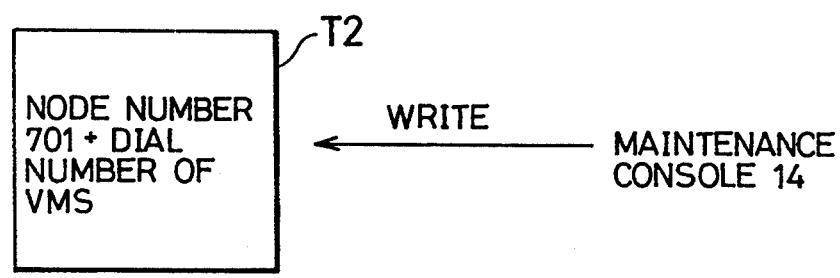
Figure 5:
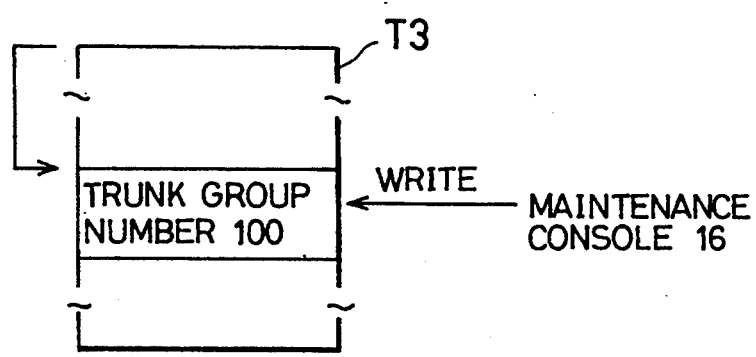
Figure 6:
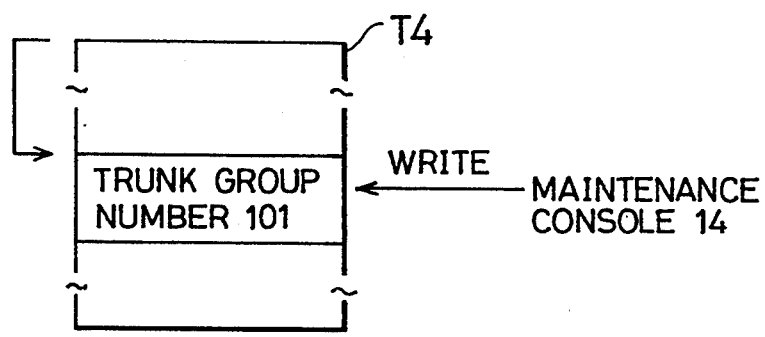
Figure 7A:
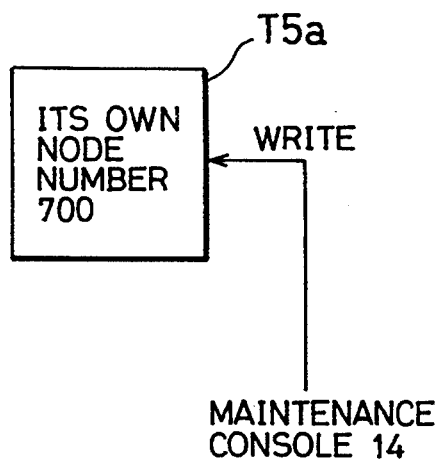
Figure 7B:
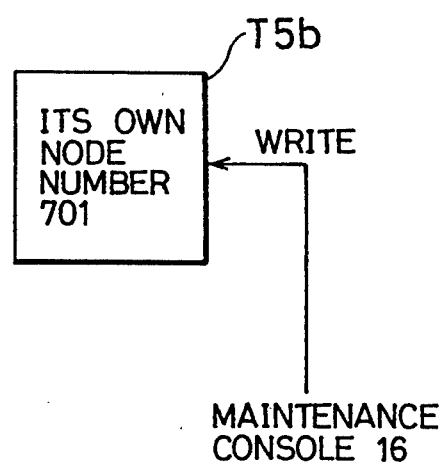

When a user at the mailbox holder terminal 13 shown in FIGS. 2A and 2B dials "the registration special number representing no response forwarding plus the node number 701 of the electronic switch 15 plus the dial number of the VMS 17", the table T1 is retrieved with the logical extension number of the terminal 13 as shown in FIG. 3. As the forwarding reason, "no response" is registered in the table T1. That is, no response forwarding service is registered.

Furthermore, entering a command from the maintenance consoles 14 and 16 allows setting the above each data in tables T2 through T4, T5a and T5b as shown in FIGS. 4 through 7.

Figure 8:
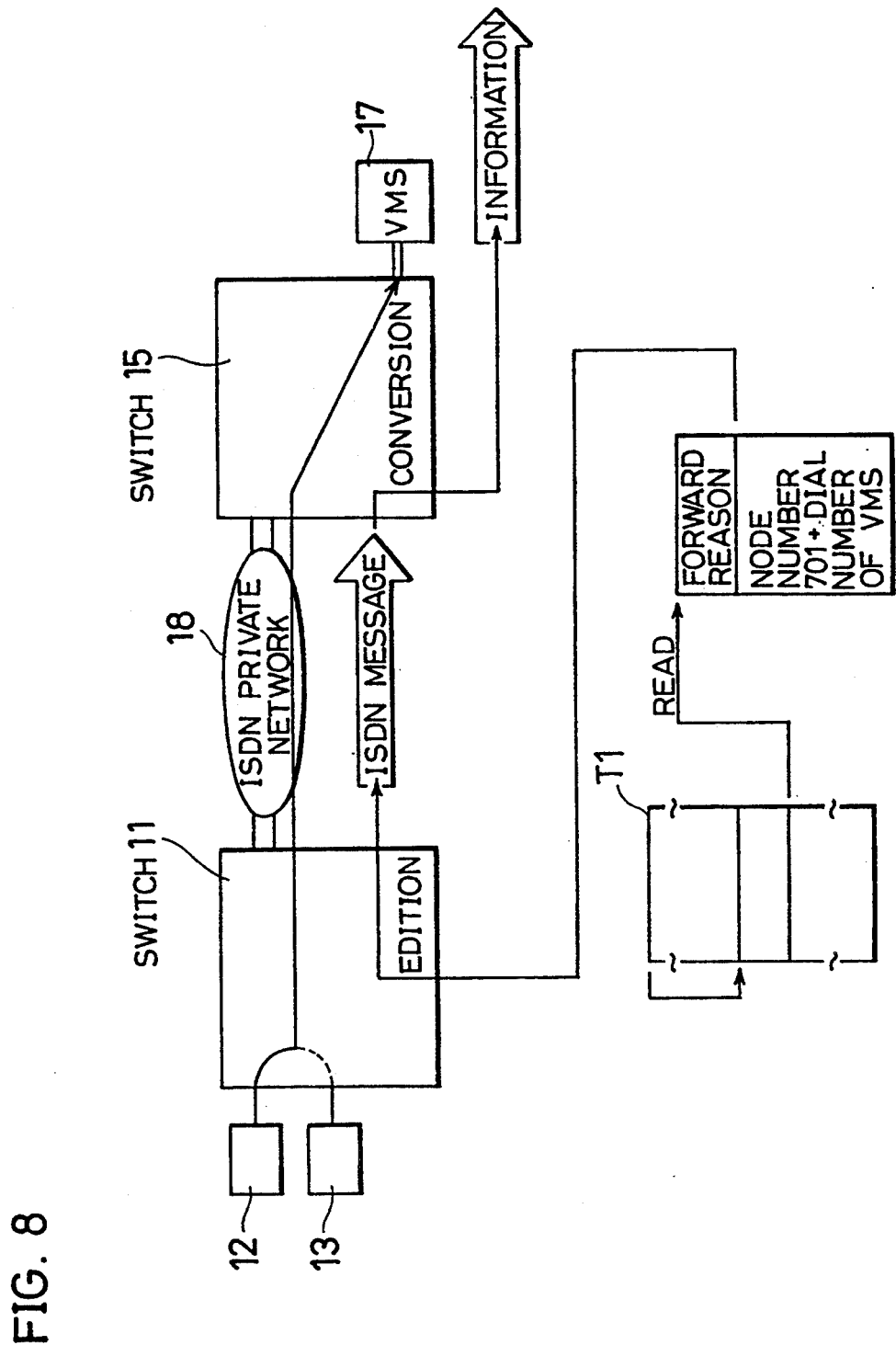
Figure 9:
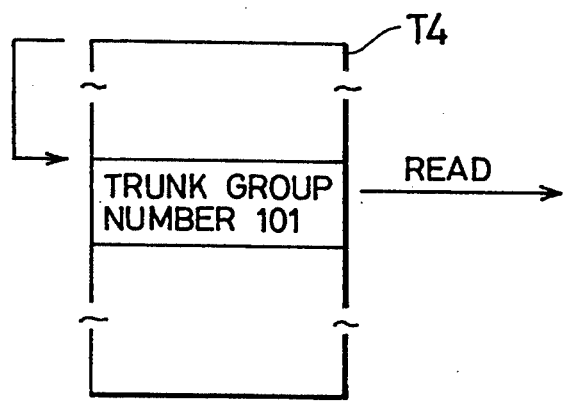
Figure 10:
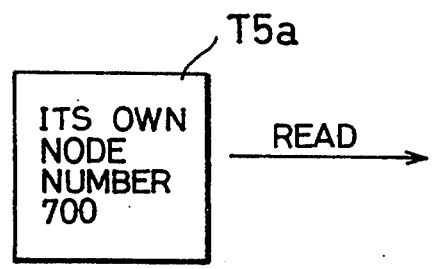

FIGS. 8 through 10 are a view illustrating a process in which when the user at the terminal 12 dials the dial number of the terminal 13, the registration of the no response forwarding service at the terminal 13 executes the forwarding service after several seconds, the user terminal 12 is connected to the VMS 17 on the side of the electronic switchboard 15, and then a response to the user terminal 12 is entrusted with the VMS 17.

In the first embodiment shown in FIG. 2A, when the user at the user terminal 12 dials the number of the mailbox holder terminal 13, the forwarding reason editor M1 in the electronic switch 11 utilizes the logical extension number of the terminal 13 to read from the table T1 the forwarding reason why the incoming call is forwarded from the mailbox holder terminal 13 to the VMS 17 (no response here in this case) and "the node number of the electronic switch 15 plus the dial number of the VMS 17" which are edited into a part of the ISDN message. Furthermore the forwarding reason editor M1 adds "its own node number 700 read from the table T5a and the dial number of the terminal 13" into another part of the ISDN message.

In the embodiment shown in FIG. 2B, in which the user terminal 12 is coupled to the electronic switch 23, upon the user terminal 12 dialing the node number 700 of the electronic switch 11 coupled to the mailbox holder terminal 13 and the dial number of the mailbox holder terminal 13, the normal switch controller 23A in the electronic switch 23 routes the dial number of the mailbox holder terminal 13 to the switch 11 via the network 20 or 21.

Thereafter, the electronic switch 11 selects the logical extension number of the terminal 13 to transfer the number to the forward reason editor M1. After that, processing between the electronic switch 11 and the electronic switch 15 is common with the embodiment shown in FIG. 2A. Explanation will be given hereinafter by using the embodiment shown in FIG. 2A.

The route determination portion M7 transmits the ISDN message to the route toward the trunk group number 101 corresponding to the node number 701 of the electronic switch 15 read from the table T4.

The address editor M3 in the electronic switchboard 15 which has received the ISDN message converts the forwarding reason included in the ISDN message as well as the node number 700 plus the dial number of the terminal 13 into information having a format 13 identifiable by the VMS 17 and transmits the converted information to the VMS 17.

At this time, the user terminal 12 is connected to the VMS 17. In other words, the user terminal 12 can access a mailbox which the mailbox holder terminal 13 owns in the VMS 17. Then, in such case, the VMS 17 transmits to the terminal 12 a notification that the mailbox holder terminal provides "no response" and a guidance for soliciting a message registration. The user at the user terminal 12 hears this guidance and registers a message to the VMS 17.

The user at the user terminal 12 completes the message registration to the VMS 17 and breaks off the connection with the VMS 17.

Figure 11:
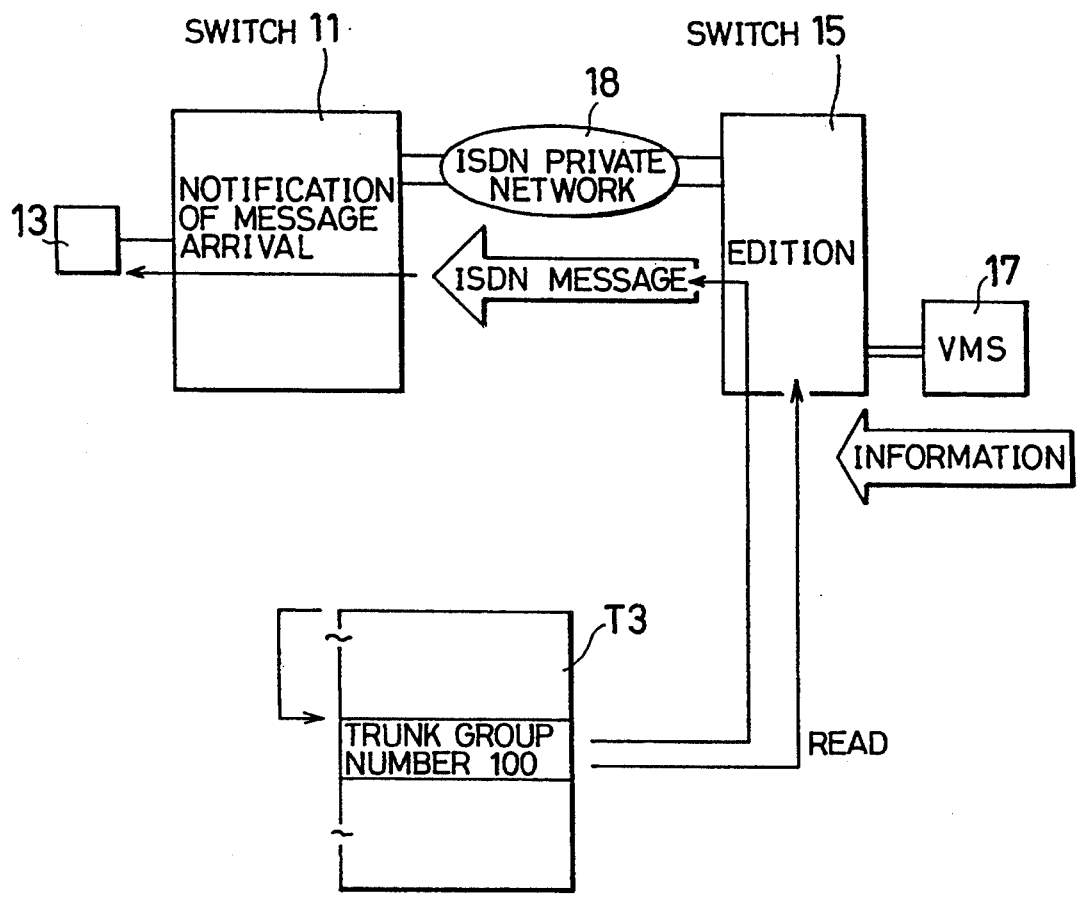
Figure 12:
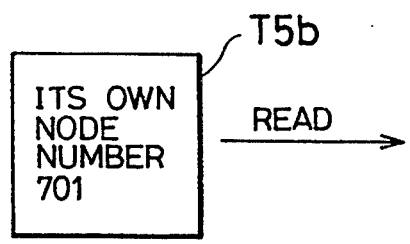

As shown in FIGS. 11 and 12, the VMS 17 notifies the electronic switch 15 of the arrival of the message from the terminal 12 with identification data (referred to as ID hereinafter) of the mailbox holder terminal 13. The ID corresponds to the node number of the electronic switch 11 and the dial number of the terminal 13.

The node identification portion M4 in the electronic switch 15 reads from the table T5b its own node number 701 to check the number with the node number 700 included in the ID of the mailbox holder terminal 13. Since the two node numbers do not agree with each other, the node identification portion M4 reads from the table T3 the trunk group number "100" corresponding to the node number 700 of the electronic switch 11 included in the ID of the mailbox holder terminal 13. The message transmission portion M5 edits into an ISDN message information indicating that the message has arrived and the dial number of the terminal 13 included in the ID of the mailbox holder terminal 13 to transmit the edited ISDN message to the route of the trunk group number "100".

The notification portion M6 in the electronic switch 11 which has received the ISDN message calculates a position where the terminal 13 is housed based on the dial number of the terminal 13 included in the ISDN message. Then the notification portion M6 transmits a command to the terminal 13 thereby changing the state at the terminal 13 into the state of the message arrival.

Preferably, the terminal 13 comprises a lamp for indicating "the message arrival", or a function in which the user can identify it with a specified audible tone.

Figure 13:
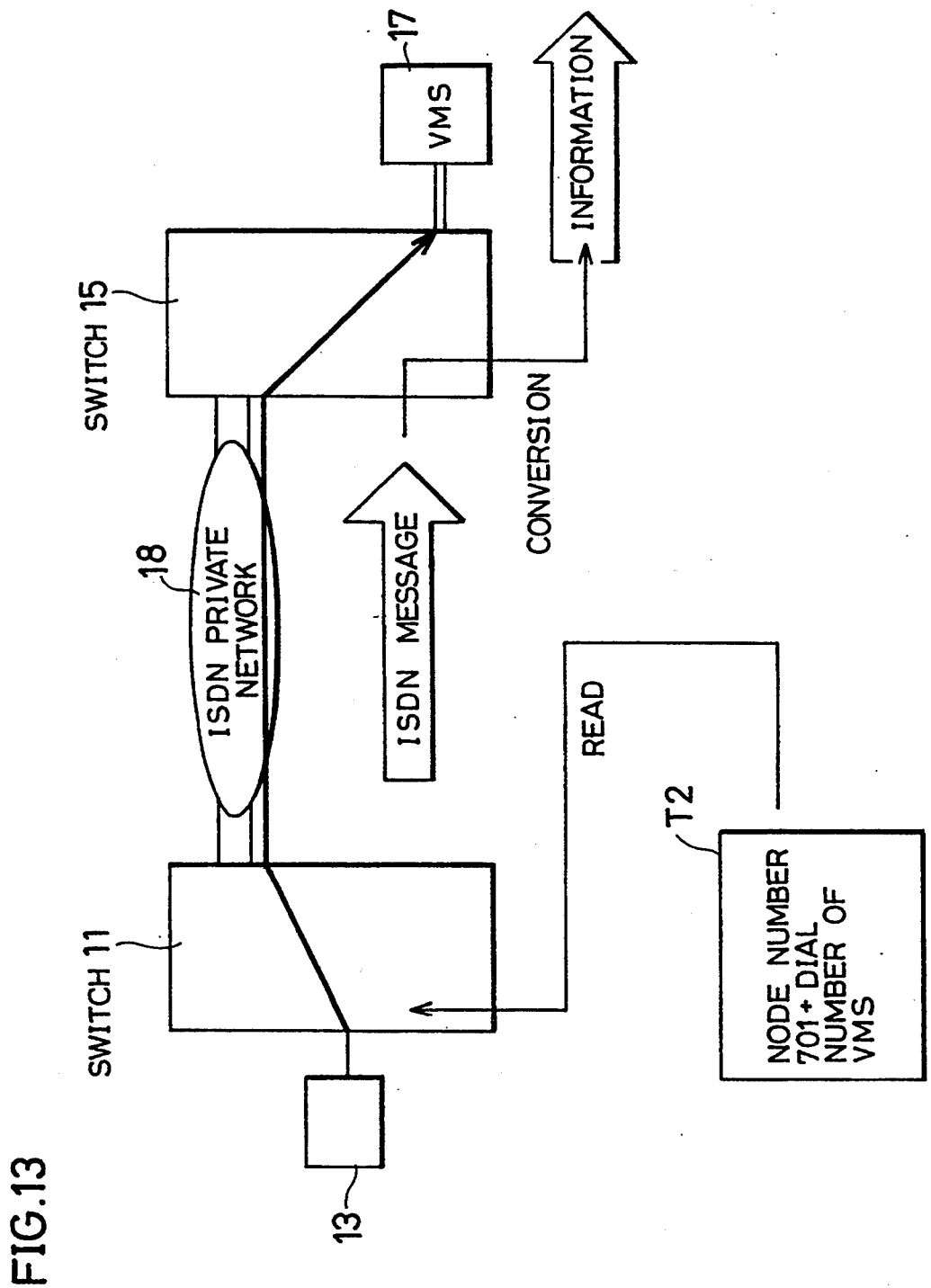
Figure 14:
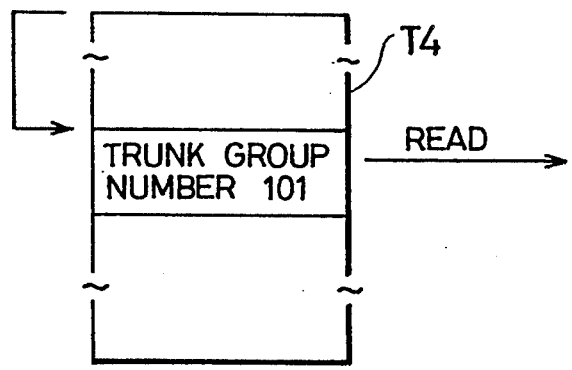
Figure 15:
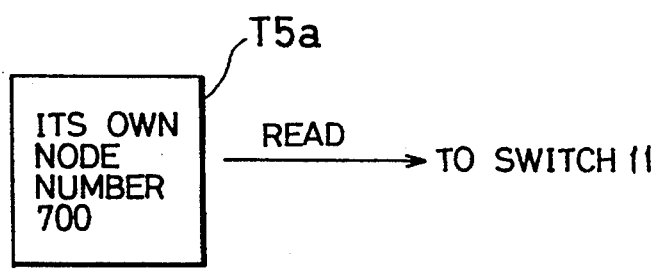

FIGS. 13 through 15 are a view illustrating a process in which after the user at the terminal 13, upon identifying that the message has arrived, hears the dial tone, dials a special number and hears the message addressed to himself from VMS 17.

When the user at the terminal 13 dials the special number, the route determination portion M7 in the electronic switch 11 reads from the table T2 and temporarily stores the node number 701 of the electronic telephone switch 15 plus the dial number of the VMS 17.

Then the route determination portion M7 reads the node number 700 of the electronic switch 11 from the table T5a to check the number with the stored node number 701 of the electronic switch 15. In such case, since the two node number do not agree with each other, the route determination portion M7 automatically executes a transmission to the route of the trunk group number 101 corresponding to the node number 701 of the electronic switch in the table T4. Consequently, the terminal 13 is connected to the VMS 17, and the user of the terminal 13 hears the message addressed to himself from the VMS 17.

Figure 16:
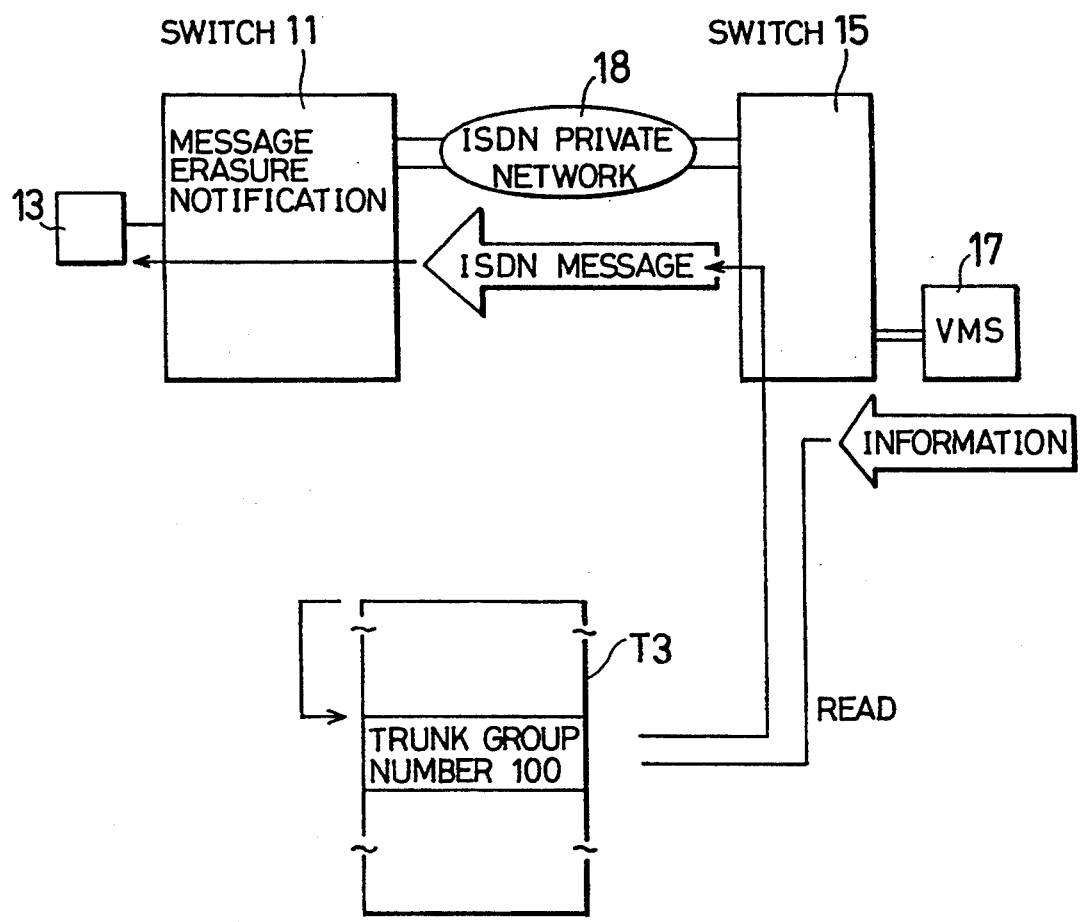
Figure 17:
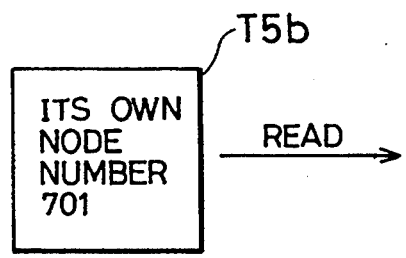

The user at the terminal 13, upon hearing all the message addressed to himself, dials a message erasure code in accordance with a guidance from the VMS to complete the erasure of the message registered in VMS 17. Then, as shown in FIGS. 16 and 17, the VMS 17 notifies the electronic switch 15 of the completion of the erasure and the ID of the mailbox holder terminal 13.

The node identification portion M4 in the electronic switch 15 reads the node number 701 from the table T5b to check the number 701 with the node number 700 included in the ID of the mailbox holder terminal 13. At this time, since the two numbers do not agree with each other as a result of the check, the node identification portion M4 reads from the table T3 the trunk group number "100" corresponding to the node number 700 included in the ID of the mailbox holder terminal 13.

Then the message transmission portion M5 edits information indicating the completion of the erasure and the dial number of the terminal 13 included in the mailbox holder ID into a part of the ISDN message and transmits them to the route of the trunk group number 100 read from the table T3. The notification portion M6 in the electronic switch 11 which has received the ISDN message calculates a position where the terminal 13 is housed based on the dial number of the terminal 13 included in the ISDN message, and transmits a command message to the terminal 13 thereby changing the state of the terminal 13 to the state of "the absence of the message".

According to the present invention, the management of a voice mail service over a plurality of electronic switches having a network eliminates the need of purchasing a plurality of expensive VMS's. Furthermore since collective control of the mailbox can be managed at one place, database renewal and management work can be facilitated.

What is claimed is:

1. A method for controlling electronic telephone switches comprising:
   (1) linking a plurality of telephone switches to each other over a digital network;
   (2) coupling one of the telephone switches to a voice mail system (VMS) having a mailbox;
   (3) storing a VMS identifier in the plurality of telephone switches;
   (4) routing a telephone call of a first user from a telephone switch coupled to the first user to a telephone switch coupled to a second user, when the first user requests to be connected with the second user;
   (5) routing an identifier of the second user from the telephone switch coupled to the second user to the VMS based upon the VMS identifier and connecting the call of the first user to the VMS if the second user is a holder of the mailbox,
   wherein, if dialing signals are received from the second user, for designating digital data representing a reason why a telephone call is forwarded from the second user to the VMS, the designated digital data is stored in a memory of the telephone switch coupled the second user, the designated digital data is routed to the VMS, and the VMS converts the digital data to audible data to be heard by the first user;
   (6) forwarding information from the first user to the VMS and storing the information in the mailbox;
   (7) transmitting data from the VMS to the second user based upon the identifier of the second user, the data representing that the VMS has the information in the mailbox;
   (8) routing the stored information to the second user at a second user's request from the second user; and
   (9) erasing the information stored in the mailbox.

2. The method of claim 1 in which step (3) comprises the steps of receiving from the second user dialing signals including the VMS identifier, and storing data corresponding to the VMS identifier in a memory area of the telephone switch coupled to the second user, the memory area being addressed by the identifier of the second user; and step (5) comprises the steps of reading the VMS identifier from the memory area, determining a route to the VMS based upon the VMS identifier, and routing the identifier of the second user and the call of the first user to the VMS through the determined route.

3. The method of claim 1 in which step (7) comprises the steps of determining a route to the second user based upon the identifier of the second user, and routing the data to the second user through the determined route.

4. The method of claim 1 in which step (8) further comprises the steps of receiving a telephone call from the second user, and routing the call to the VMS based upon the VMS identifier to connect the second user to the VMS.

5. The method of claim 1 in which step (9) comprises the steps of receiving from the second user dialing signals including a code for erasing the stored information, routing the code to the VMS based upon the VMS identifier, and permitting the VMS to erase the information stored in the mailbox.

6. The method of claim 1 in which step (9) comprises the steps of determining a route to the second user based upon the identifier of the second user, and routing a response from the VMS to the second user through the determined route when the stored information has been erased.

* * * * *